(12) United States Patent
Dutau

(10) Patent No.: US 9,601,955 B2
(45) Date of Patent: Mar. 21, 2017

(54) ROTOR COMPRISING POLE SHOES WITH COOLING CHANNELS

(71) Applicant: MOTEURS LEROY-SOMER, Angouleme (FR)

(72) Inventor: Alexis Dutau, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 278 days.

(21) Appl. No.: 14/350,277

(22) PCT Filed: Oct. 4, 2012

(86) PCT No.: PCT/IB2012/055324
§ 371 (c)(1),
(2) Date: Apr. 7, 2014

(87) PCT Pub. No.: WO2013/050955
PCT Pub. Date: Apr. 11, 2013

(65) Prior Publication Data
US 2014/0265668 A1    Sep. 18, 2014

(30) Foreign Application Priority Data
Oct. 6, 2011    (FR) ..................................... 11 59042

(51) Int. Cl.
*H02K 1/32* (2006.01)
*H02K 1/24* (2006.01)

(52) U.S. Cl.
CPC ................. *H02K 1/32* (2013.01); *H02K 1/24* (2013.01); *H02K 1/325* (2013.01)

(58) Field of Classification Search
CPC ............ H02K 1/325; H02K 1/24; H02K 1/32

USPC ....................................................... 310/59, 61
See application file for complete search history.

(56) References Cited

U.S. PATENT DOCUMENTS

| 2,539,747 | A | * | 1/1951 | Moore | .................... H02K 3/527 |
|---|---|---|---|---|---|
| | | | | | 29/598 |
| 3,049,633 | A | * | 8/1962 | Cain | ......................... H02K 3/22 |
| | | | | | 310/54 |
| 3,633,054 | A | | 1/1972 | Wiedeman | |
| 3,846,651 | A | | 11/1974 | Mishra | |
| 4,139,789 | A | | 2/1979 | Hunt | |
| 5,703,421 | A | * | 12/1997 | Durkin | ..................... H02K 1/20 |
| | | | | | 310/52 |
| 7,208,854 | B1 | * | 4/2007 | Saban | ...................... H02K 1/32 |
| | | | | | 310/52 |

(Continued)

FOREIGN PATENT DOCUMENTS

| DE | 19 09 123 A1 | 9/1970 |
|---|---|---|
| EP | 0 881 757 A1 | 12/1998 |

(Continued)

OTHER PUBLICATIONS

Search Report issued in French Application No. 1159042 dated May 24, 2012 (with translation).

(Continued)

*Primary Examiner* — Alex W Mok
(74) *Attorney, Agent, or Firm* — Oliff PLC

(57) ABSTRACT

The present invention relates to a rotor for a rotary electric machine, extending along a longitudinal axis, including: projecting poles having pole shoes, and at least one internal cooling channel extending axially along at least one pole shoe.

13 Claims, 3 Drawing Sheets

(56) References Cited

U.S. PATENT DOCUMENTS

2007/0120429 A1* 5/2007 Howard .................. H02K 1/32
                  310/61

FOREIGN PATENT DOCUMENTS

| GB | 2 425 662 A | 11/2006 |
|----|-------------|---------|
| JP | U-56-174937 | 12/1981 |
| WO | WO 2010/079455 A2 | 7/2010 |

OTHER PUBLICATIONS

Written Opinion issued in French Application No. 1159042 dated May 24, 2012 (with translation).
International Search Report issued in International Application No. PCT/IB2012/055324 dated May 28, 2013 (with translation).
Written Opinion of the International Searching Authority issued in International Application No. PCT/IB2012/055324 dated May 28, 2013 (with translation).

* cited by examiner

ROTOR COMPRISING POLE SHOES WITH COOLING CHANNELS

BACKGROUND

The subject of the present invention is a wound rotor for an electrical rotating machine, and a machine comprising such a rotor.

The present invention applies more particularly but not exclusively to the cooling of the windings of the rotor of open, single-phase or polyphase electrical rotating machines having a rotation speed of, for example, between 0 and 10,000 revolutions per minute, and a power of, for example, between 0.1 and 25 MW.

RELATED ART

"Open electrical rotating machine" means a machine cooled by a flow of air drawn from outside the machine.

In order to cool a rotor, it is known practice to arrange cooling channels in the latter.

Application GB 2,425,662 therefore discloses the production of small cut-outs in the pole shoes of the poles of a rotor with salient poles so as to arrange a channel between each pole and the wound electrical conductors of this pole.

It is known from patent U.S. Pat. No. 3,846,651 to arrange channels oriented radially through the pole shoes of the fitted poles of a rotor in order to create passageways allowing a cooling fluid to flow.

U.S. Pat. No. 3,633,054 teaches the placing against the pole shoes of a salient pole a metal bar in which orifices are arranged allowing, a cooling fluid to flow.

Publication WO 2010/079455 discloses various arrangements designed to cool a rotor with salient poles.

U.S. Pat. No. 4,139,789 describes poles comprising a plurality of cooling channels, part of some of these channels being disposed at the root of the pole shoes.

There is a need to further improve the cooling of a rotor of an electrical rotating machine.

SUMMARY

The object of the invention is to respond to this need and it achieves this object, according to one of its aspects, by virtue of a rotor for an electrical rotating machine extending along a longitudinal axis, comprising:
  salient poles having pole tips or pole shoes, and
  at least one internal cooling channel running axially through at least one pole shoe, better through each pole shoe.

"internal channel" should be understood to be a contour channel closed in cross section.

The invention makes it possible to improve the thermal performance of the machine and to reduce the heating of the rotor windings for a given volume of copper.

The invention also makes it possible to reduce the maximum temperature of the electrical conductors and of the insulators for a given volume of copper, and to reduce the overall cost of the machine, by virtue of reducing the quantity of active material at identical thermal states compared with a known machine.

In the rest of the description, the cooling fluid is preferably air, but the invention is not limited to air as the cooling fluid.

The rotor allows the cooling fluid to flow along the channels.

Depending on the desired cooling of the rotor, a greater or lesser number of cooling channels, for example between 1 and 15 channels, run through the pole shoes of the salient poles.

The various cooling channels may be defined between fins arranged in the pole shoes.

The fins may extend over all or part of the length of the rotor. In particular, the fins may be interrupted and the pole shoe then has a dentate shape.

The fins may be placed in various ways within the pole shoe.

Each cooling channel may run through the whole length of the magnetic carcass of the rotor. Each cooling channel may run through the rotor continuously or noncontinuously along the longitudinal axis of the latter.

The pole shoes may have a dentate shape defining teeth. The cooling channels are then arranged in these teeth. Such a configuration allows the cooling fluid to undergo an alternation of passageways inside the channels and of passageways in widened zones extending axially between the teeth. This makes it possible to further improve the convection thermal exchanges. Moreover, the cooling fluid can flow transversely between the teeth. The presence of the pole shoes on the periphery of the rotor makes it possible to benefit from a conversion of radial kinetic energy of the cooling fluid into axial kinetic energy.

The dentate shape may be obtained by a staggered arrangement of packs of metal sheets, by turning the packs over alternately.

When moving around the longitudinal axis of the rotor, two consecutive series of teeth which may or may not belong, to one and the same pole can offset axially by one tooth, the space between the teeth being for example equal to the axial dimension of a tooth. This limits the pressure losses.

Each pole shoe may have a cut-out section, due to the cooling channels running through it, representing more than 25% of its total section.

The salient poles each comprise a pole body and two pole shoes. Two adjacent salient poles define between them an interpolar space.

At least one cooling channel may be arranged in the bottom of the interpolar space in order to further improve the cooling of the rotor.

It is therefore possible to obtain for each pole a flow of cooling fluid within the pole shoes and a flow in the interpolar spaces.

The salient poles of the rotor may be formed by an assembly of magnetic sheets.

Each magnetic sheet may be in a single piece with all its poles. All the sheets of the rotor may be identical, each sheet having salient poles having only one pole shoe, all the shoes of a sheet being directed in the same circumferential direction. When the rotor is assembled, the sheets are assembled by being superposed exactly in packs of the thickness of one tooth as mentioned above, then another pack formed of sheets placed the other way round is juxtaposed to the first and so on so as to form an alternation of teeth and of enlarged passageways along each pole shoe.

The rotor may comprise tie-rods for retaining the assembly of magnetic sheets.

The rotor may comprise, at the radially outer end of the pole bodies, housings for receiving dampers.

The rotor may comprise two end-plates in order to make the operation of winding easier and to improve the general mechanical strength of the rotor.

A further subject of the invention according to another of its aspects, is an electrical rotating machine comprising a rotor as defined above.

The electrical rotating machine comprises a stator inside which the rotor rotates.

The machine may comprise one or more fans, which may or may not be driven by the rotor, in order to create a flow of forced air in the various cooling channels.

BRIEF DESCRIPTION OF THE DRAWINGS

The invention will be better understood on reading the following description of non-limiting exemplary embodiments of the latter and on examining the appended drawing in which.

DETAILED DESCRIPTION OF THE INVENTION

Figure 1:
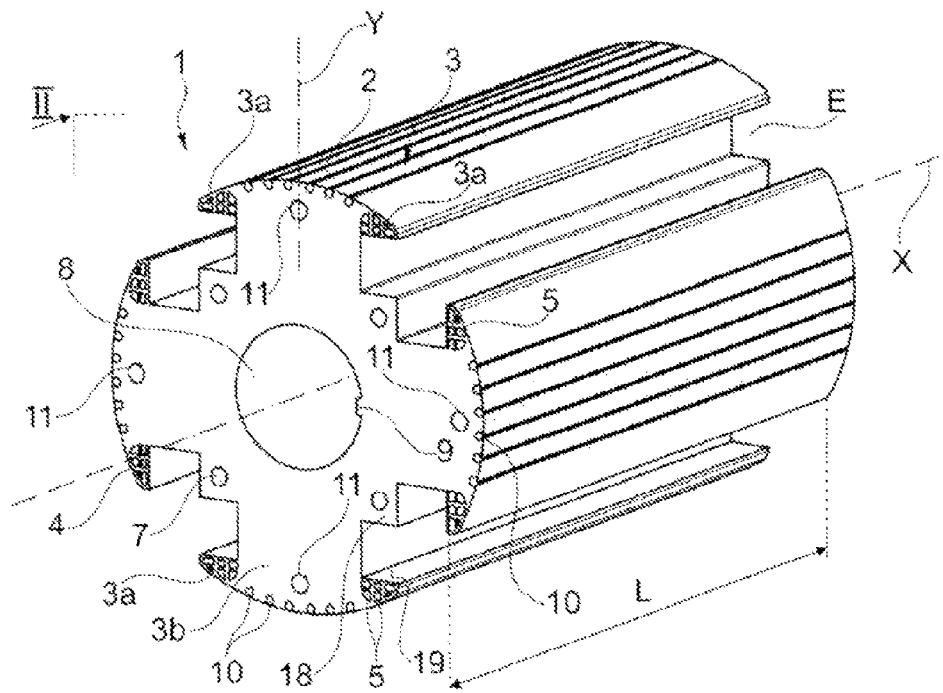
FIG. 1 is a schematic and partial perspective of an example of magnetic carcass of a rotor according to the invention.

FIG. 1 shows a first example of magnetic mass of a rotor 1 which extends along a longitudinal axis X and comprises an assembly of magnetic sheets 2, forming salient poles 3, being four in number in the example illustrated, the invention not however being limited to a particular polarity.

As can be seen in FIG. 1, each pole 3 comprises a pole body 3b, which extends along a centre line Y, and two pole shoes 3a which protrude in the circumferential direction.

Two adjacent poles 3 define between them an interpolar space E.

Figure 5:
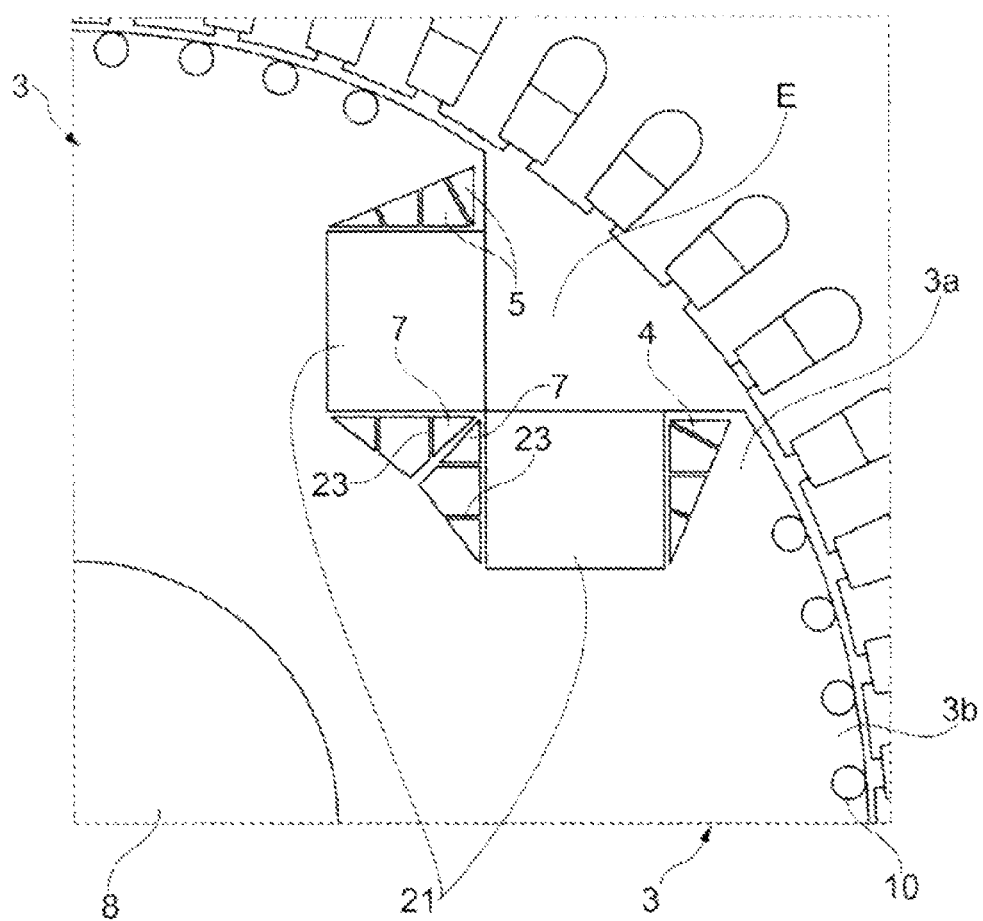
FIG. 5 represents a detail of the production of an electrical machine according to the invention.

Electrical conductors are wound around each pole 3 and define windings 21 that can be seen in FIG. 5.

Each sheet is preferably in one piece being cut out from one and same magnetic flat band.

The rotor 1 may comprise tie-rods (not shown) for retaining the assembly of magnetic sheets 2 passing through the rotor mass by virtue of openings 11 situated on the poles 3.

A central housing 8, furnished with an anti-rotation means 9, is arranged in the rotor mass in order to receive a shaft (not shown).

The rotor mass of the rotor 1 may also comprise, as illustrated, housings 10 for receiving dampers (not shown).

According to the invention, at least one internal cooling channel 5 runs axially through each pole shoe 3a. Within a sheet, this channel does not lead to the outer contour of the sheet, the contour of the channel being closed.

Figure 2:
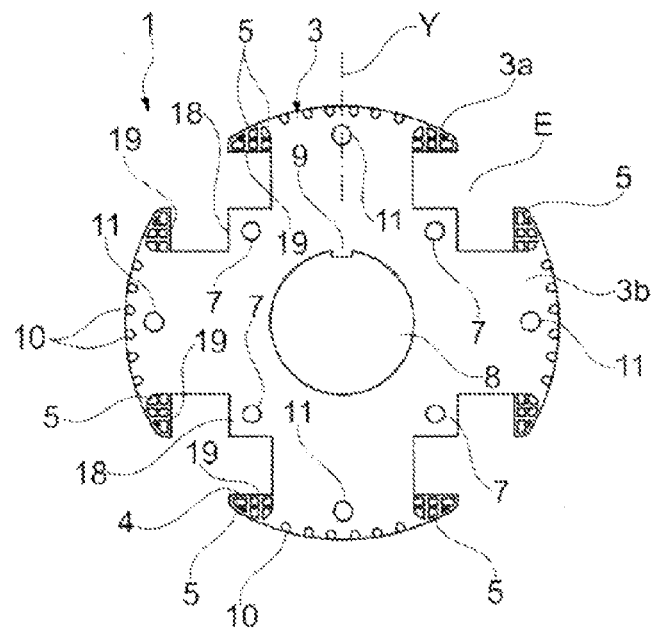
FIG. 2 is a front view along II of FIG. 1.

Preferably, several cooling channels 5 run through each pole shoe 3a, for example six channels, as illustrated in FIGS. 1 and 2.

Fins 4 made in the pole shoes 3a of the poles 3 separate the various cooling channels 5.

In the example of FIGS. 1 and 2, each cooling channel 5 runs through the whole length L of the rotor 1 continuously without interruption.

The magnetic mass may be formed by the stacking of identical magnetic sheets, the channels 5 and the fins 4 being formed by cutting out the sheet within the pole shoes.

At the base of each interpolar space E, an additional cooling channel 7 may be provided as illustrated.

The channel 7 is for example of circular section, being, for example made in an extension 18 in the form of a right angle, with sides parallel to the faces 19 opposite the pole shoes 3a.

Figure 3:
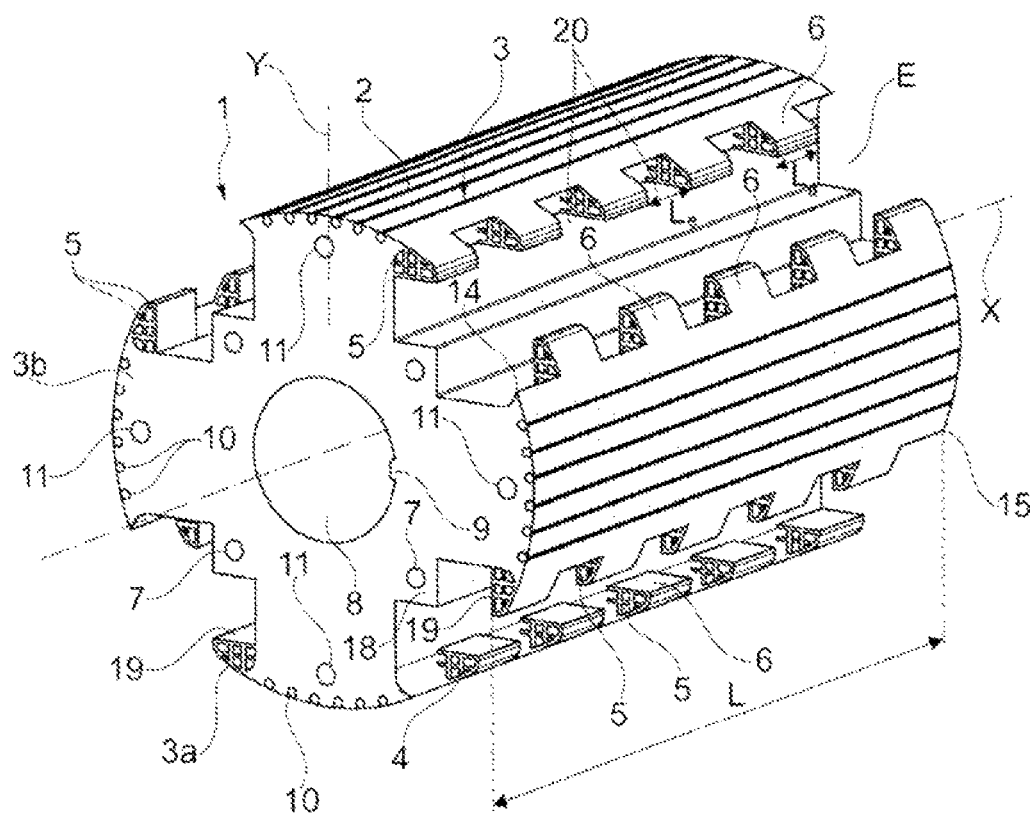
FIG. 3 is a view similar to FIG. 1 of another example of a magnetic carcass of a rotor according to the invention.

In the variant illustrated in FIG. 3, the pole shoes 3a each have a dentate shape defining teeth 6, numbering five per pole shoe 3a in the example described, the invention however not being limited to a particular number of teeth.

The cooling channels 5 are arranged in the teeth 6, and the gap 20 between the teeth 6 defines a passageway of widened section for the cooling fluid.

When moving around the longitudinal axis X of the rotor 1, two consecutive series of teeth 6 are offset axially by one tooth, the axial dimension $L_a$ along the axis X of a tooth 6 is able to be equal to the dimension $L_e$ of the gap 20 between two teeth 6.

The pole shoes 3a of one and the same pole advantageously have no teeth at two opposite axial ends 14, 15, as shown in FIG. 3. This makes the installation of the windings easier, which can be carried out with prefabricated windings.

Figure 4:
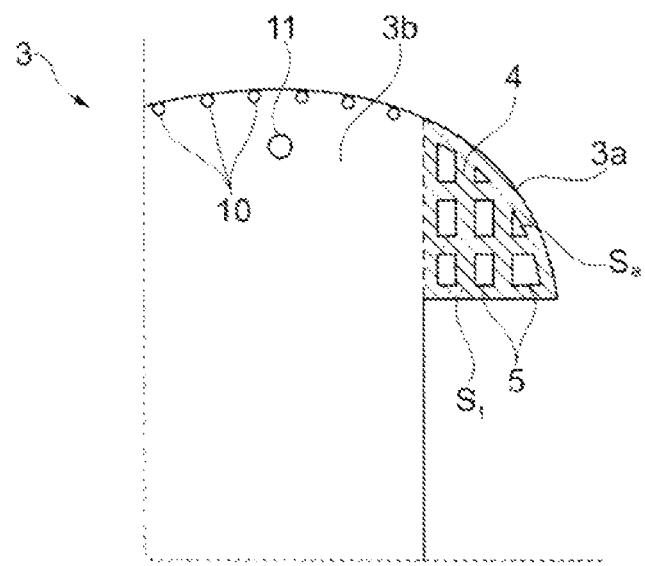
FIG. 4 represents in isolation and partially a salient pole according to an exemplary embodiment of the invention.

Each pole shoe 3a has a total section s shown with cross hatching in FIG. 4, and a cut-out section $s_a$, defined by the cooling channels 5 running through the pole shoe 3a. The cut-out section $s_a$, preferably represents more than 25% of the total section $s_t$ of the pole shoe 3a. The section $s_t$ is delimited by the external contour of the shoe 3a and by an imagined straight line extending the body 3b of the pole.

The channels 5 may have different sections within one and the same pole shoe 3a.

In order to produce the magnetic mass of FIG. 3, identical sheets are used but inverted in packs so as to form the alternation of teeth 6 and of widened passageways 20 between two consecutive teeth 6.

The rotor 1 is for example incorporated into an electrical rotating machine, not shown, comprising a centrifugal fan. As a variant, the fan is a multi-channel fan. In yet another variant, the fan is made by placing in series a centrifugal fan and an axial fan.

The air aspirated by the fan passes through the cooling channels 5 situated in the pole shoes 3a of each salient pole 3. Moreover, the air can flow in the air gap and through the channels 7 arranged at the base of the interpolar spaces E.

When the channels 5 run discontinuously through the pole shoes 3a, that is to say when the pole shoes of the salient poles 3 each have a dentate shape as illustrated in FIG. 3, such a discontinuity allows a transverse flow of the air from the gaps 20 between two teeth 6 to the interpolar space E.

FIG. 5 shows partially the stator and the rotor of an electrical rotating machine according to the invention. This figure shows that the single cut-out of the extension 18 defining the channel 7 of the examples of FIGS. 1 and 3 can be replaced by a plurality of channels 7 separated by fins 23.

The invention is not limited to the examples that have just been described.

It is possible for example to combine the features described with reference to various embodiments within variants that are not illustrated.

The fins 4 may be of any shape.

The invention may be applied to rotors with fitted pole shoes. The invention is not limited to particular salient poles.

The invention may apply to one-piece rotors machined in a solid piece of a magnetic material.

The expression "comprising one" must be understood to be synonymous with "comprising at least one", unless the contrary is specified.

The invention claimed is:

1. Rotor for an electrical rotating machine, extending along a longitudinal axis, comprising:
    salient poles, each comprising a pole body which extends along a center line, and two pole shoes which protrude in the circumferential direction, and
    internal cooling channels running axially through at least one pole shoe, the cooling channels being separated within the pole shoe by fins, all the cooling channels being present only in the pole shoe(s).

2. Rotor according to claim 1, the pole shoes of the salient poles each having 2 to 15 cooling channels running through them.

3. Rotor according to claim 1, the cooling channels running through the whole length of the magnetic mass of the rotor.

4. Rotor according to claim 1, the cooling channels continuously running through the rotor along its longitudinal axis.

5. Rotor according to claim 1, the pole shoes each having a dentate shape defining teeth.

6. Rotor according to the claim 5, two consecutive series of teeth, when moving around the longitudinal axis of the rotor, being offset axially by one tooth.

7. Rotor according to claim 5, the axial dimension of one tooth being equal to that of the gap between two teeth.

8. Rotor according to claim 1, each pole shoe having a cut-out section representing more than 25% of its total section.

9. Rotor according to claim 1, two adjacent salient poles defining between them an interpolar space, at least one cooling channel running through an extension at the base of the interpolar space.

10. Rotor according to claim 1, the salient poles being formed by an assembly of identical and one-piece magnetic sheets.

11. Rotor according to claim 1, being in one piece.

12. Electrical rotating machine comprising a rotor according to claim 1.

13. Rotor for an electrical rotating machine, extending along a longitudinal axis, comprising:
    salient poles, each comprising a pole body which extends along a center line and two pole shoes which protrude in the circumferential direction, two adjacent salient poles defining between them an interpolar space, and
    internal cooling channels running axially through at least one pole shoe, the cooling channels being separated within the pole shoe by fins, several internal cooling channels being arranged side by side extending along face(s) of the pole shoe(s) adjacent to the interpolar space, their fins being perpendicular to said face adjacent to the interpolar space.

* * * * *